Sept. 17, 1957 W. G. HALL ET AL 2,806,554
ELEVATOR CONTROL SYSTEMS
Filed May 7, 1956 6 Sheets-Sheet 1

WITNESSES
Robert C. Baird
Leon J. Faza

INVENTORS
William G. Hall &
Robert I. Van Nice.
BY C. L. Freedman
ATTORNEY

Sept. 17, 1957 W. G. HALL ET AL 2,806,554
ELEVATOR CONTROL SYSTEMS
Filed May 7, 1956 6 Sheets-Sheet 3

United States Patent Office 2,806,554
Patented Sept. 17, 1957

2,806,554

ELEVATOR CONTROL SYSTEMS

William G. Hall, Grand Rapids, Mich., and Robert I. Van Nice, Shaler Township, Allegheny County, Pa., assignors to Westinghouse Electric Corporation, East Pittsburgh, Pa., a corporation of Pennsylvania Application May 7, 1956, Serial No. 583,047

27 Claims. (Cl. 187—29)

This invention relates to elevator systems employing landing or floor selectors, and it has particular relation to elevator systems employing selectors constructed of static components.

Different types of landing or floor selectors have been employed for controlling elevator systems. For example, a notching selector has been employed wherein a brush assembly has been notched or advanced by a predetermined discrete distance for each movement of an elevator car between successive landings. In this type of selector the brush movement is independent of the spacing between successive landings. As a further example, reference may be made to a continuous-motion type of selector wherein contact operating mechanism is advanced continuously at a rate dependent on movement of the associated elevator car. Examples of these prior art selectors will be found in the F. E. Lewis Patent 1,981,601, the C. E. Ellis Patent 1,979,679 and the C. Savage Patent 2,657,765. It should be noted that in these prior art selectors relatively movable parts such as movable carriages, brush assemblies, motor mechanisms, sliding contacts and relays have been employed. Each of these parts involves a maintenance and performance problem.

In accordance with the invention a landing selector is constructed substantially of static components. In a preferred embodiment of the invention the selector is constructed from building blocks each having two stable states. As examples of preferred building blocks reference will be made to And, Or, Not, Memory and Delay elements.

An And element responds to a plurality of conditions and has an output dependent on such conditions. The relationship is such that the And element transfers from a first to a second output condition or state only if all of the conditions are present. Thus, an And element having plural inputs may be designed to provide an output only if all of the inputs are energized.

The Or element also has an output dependent on a plurality of conditions. The relationship may be such that the Or element has an output if any of the conditions is present. Thus, an Or element having plural inputs may be designed to supply an output only if energy is supplied thereto through any of its inputs.

A Not element produces an output only while no energization is supplied to its input terminals.

The Memory element also is referred to as a "flip-flop." In response to a first condition, the Memory element produces an output which is maintained even though the first condition thereafter is discontinued. The Memory element is reset and the output terminated in response to a second condition.

As its name implies, the Delay element interposes a delay between the application thereto of an input and the production thereby of an output. Thereafter the output may continue until the input is terminated.

In a preferred embodiment of the invention the aforesaid static elements are associated in a separate group or unit for each landing or floor served by an elevator car. The groups become successively effective as the elevator car moves. Each of the groups is controlled by a directional signal, a position signal dependent on the position of the elevator car and an additional signal derived from an adjacent group of the elements. In a preferred embodiment of the invention the groups apply voltages in a predetermined order to circuits in response to movement of the elevator car.

It is therefore an object of the invention to provide an elevator system having an improved landing selector.

It is a further object of the invention to provide an elevator system having a landing selector constructed substantially of static elements.

Other objects of the invention will be apparent from the following description taken in conjunction with the accompanying drawings, in which.

Figures 1 and 1A

Although the invention may be applied to an elevator system for serving any desired number of landings, in order to simplify the presentation of the invention it will be assumed that a selector is designed for a structure employing five landings and that it is incorporated in the elevator control system described in the aforesaid Lewis Patent 1,981,601.

Figure 1:
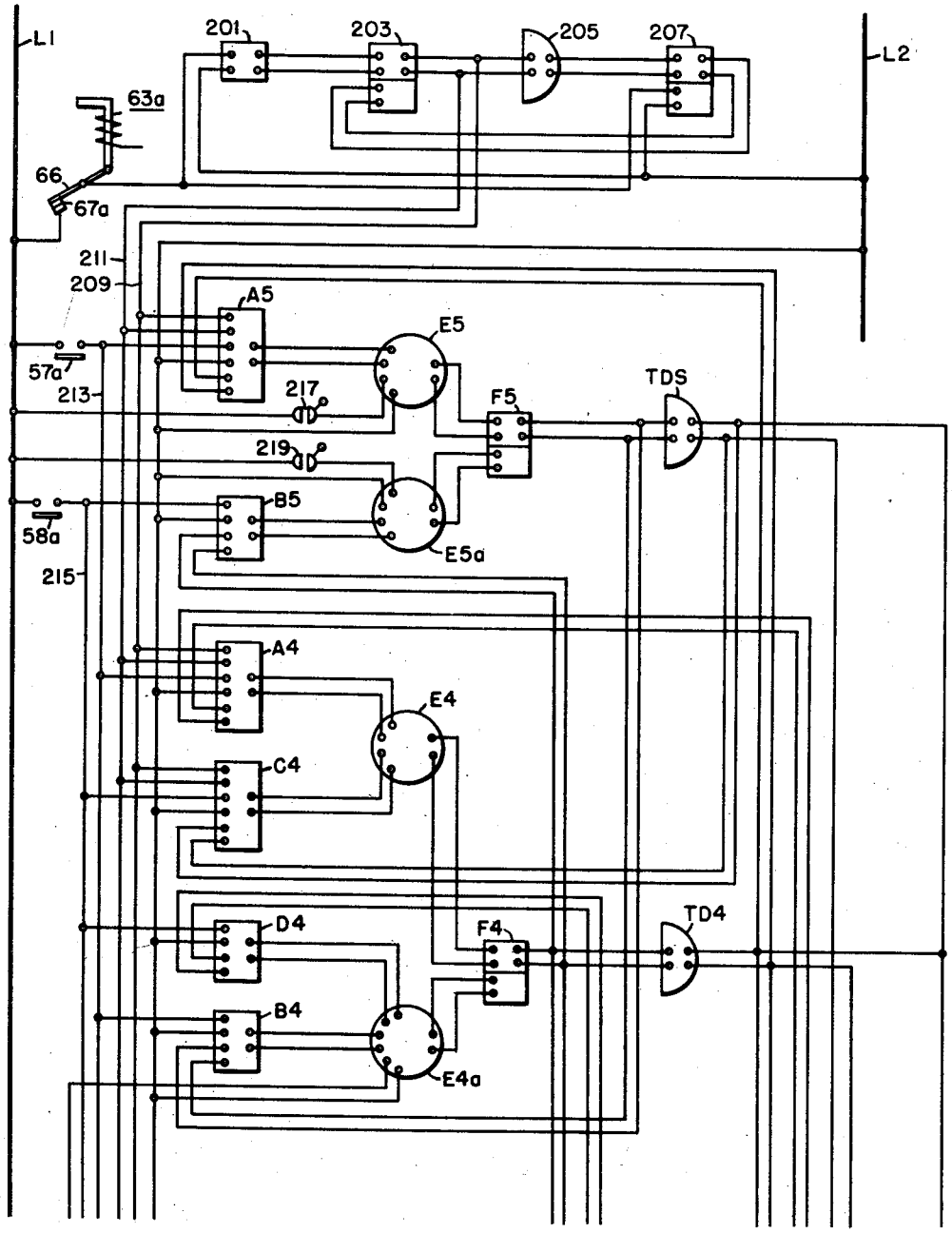
Figures 1 and 1A are schematic views of a landing selector embodying the invention. These figures show different portions of the same selector and should be arranged with Fig. 1A located below Fig. 1 in order to depict the complete selector.
Figure 1A:
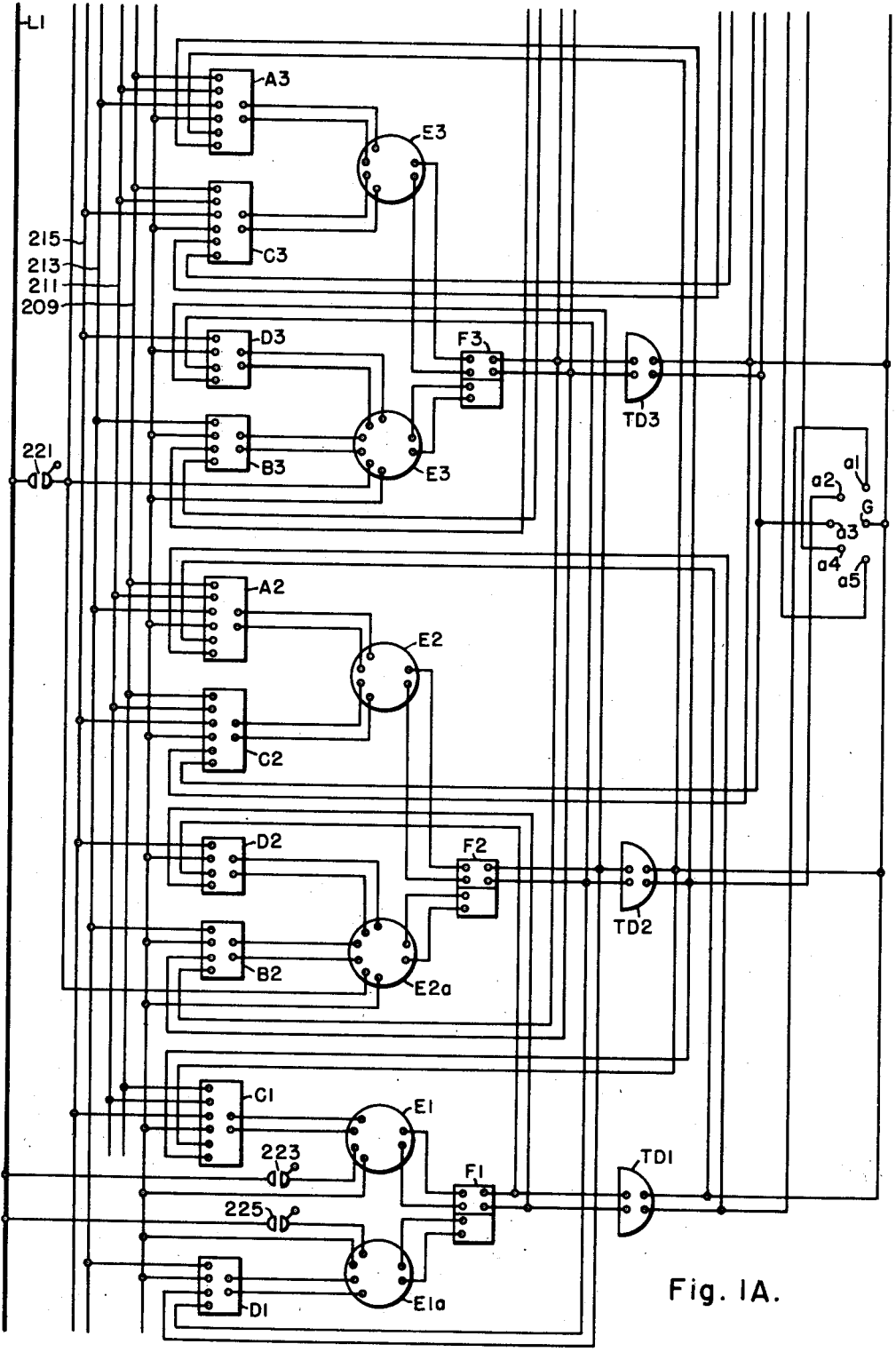

Figs. 1 and 1A show a landing selector for a building or structure having five landings in association with a notching indicator relay 63a and with a source of direct current represented by the supply conductors L1 (positive) and L2 (negative). The relay 63a may be similar in construction to the relay 63 of the aforesaid Lewis patent, with the exception that the armature 66 of the relay controls a pair of contact members 67a which are biased to closed position and which are opened when the relay is adjacent one of its associated inductor plates 71 to 74. In order to simplify the presentation still further, it will be assumed that the inductor plate 70 of the Lewis patent is not employed and that the spacing between the landings 41 and 42 is similar to the spacing between each other pair of successive landings.

For each passage of the notching inductor relay 63a past one of its associated inductor plates, it is desired to produce a notching signal having a predetermined length. To this end a Not element 201 has its input terminals connected across the direct-current source represented by the conductors L1 and L2 through the contacts 67a. Consequently, when the relay 63a is displaced from its inductor plates the contacts 67a are closed to supply an input to the Not element. As long as the Not element receives the input it produces no output. However, when the notching inductor relay reaches an inductor plate the contacts 67a open to interrupt the input to the Not element 201.

The output terminals of the Not element 201 are coupled to the operating input terminals of a Memory element 203. Consequently, when an input is supplied through this coupling to the Memory element 203, the Memory element produces an output signal. The output of the Memory element is supplied to the input terminals of a Delay element 205. This Delay element produces a delayed output which is supplied to the operating terminals of a Memory element 207. Consequently, when these terminals are energized the Memory element 207 produces an output which is coupled to the reset terminals of the Memory element 203. When so energized the Memory element 203 interrupts its output signal. From this brief discussion it follows that when the notching inductor relay 63a reaches an inductor plate the Memory element 203 produces an output for a time determined by the time delay of the Delay element 205. The output of the Memory element 203 supplies a notching signal to the buses 209 and 211.

By inspection of Fig. 1 it will be observed further that the input terminals of the Not element 201 are connected in parallel with the resetting input terminals of the Memory element 207. Consequently, the opening of the contact members 67a initiates a production of a notching signal by the Memory element 203 and this notching signal continues for the time delay introduced by the Delay element 205. Thereafter, the contact members 67a reclose to energize the Not element 201. As a result of such energization the Not element interrupts the supply of a signal therefrom to the Memory element 203. In addition, the reclosure of the contact members 67a energizes the reset input terminals of the Memory element 207 and this Memory element consequently resets. It is clear, therefore, that for each movement of the inductor notching relay 63a past one of its associated inductor plates a notching signal of predetermined length is supplied to the buses 209 and 211.

Fig. 1 also illustrates make contacts 57a which are operated by the up interlock relay 57 of the Lewis patent. Consequently, when the elevator car is set for up travel the make contacts 57a close to connect the bus 213 to the conductor L1.

In addition, make contacts 58a are provided which are operated by the down interlock relay 58 of the Lewis patent. Consequently, when the elevator car is set for down travel the make contacts 58a close to connect a bus 215 to the conductor L1.

As previously pointed out, a group of building blocks are provided for each of the landing. Thus for the fifth landing or the top landing, the building blocks include And elements A5 and B5, Or elements E5 and E5a, a Memory element F5 and a Delay element TD5. For each of these elements the numeral 5 employed in the associated reference character indicates the landing with which the element is associated. In a similar manner, when an element is associated with a landing, a numeral in the reference character for such element indicates the number of the landing.

By inspection of the drawings it will be noted that the And element A5 has three inputs, one of which is derived from the buses 209 and 211. For this reason the And element A5 can produce an output only if the notching inductor relay 63a is adjacent one of its associated inductor plates. In addition, the And element A5 has a second input connected between the bus 213 and the conductor L2. Since the bus 213 is connected to the bus L1 through the make contacts 57a only when the elevator car is set for up travel, it follows that the And element A5 can produce an output only if the elevator car is set for up travel. Finally, the And element has a third input which is derived from the output of the Delay element TD4 for the fourth floor. This input indicates that the elevator car A is in the vicinity of the fourth floor. Consequently, the three inputs necessary to produce an output from the And elements A5 indicate respectively that the elevator car is set for up travel, that it is in the vicinity of the fourth floor and that it has reached a point intermediate the successive floors such that a notching signal is supplied through the buses 209 and 211 to the And element.

The output of the And element A5 is coupled through the Or element E5 to the operating input terminals of the Memory element F5. When energized through these terminals the Memory element produces an output which is supplied to the Delay element TD5. In addition, the output also is supplied to an And element B4 for the fourth floor for resetting purposes as will be discussed below.

After the expiration of the time delay introduced by the Delay element TD5, an output from this element appears and this output is applied between a common terminal G and a terminal a5 which is associated with the fifth floor. In addition, the output is supplied to input terminals of an And element C4 associated with the fourth landing, and the purpose of this And element will be discussed below.

Turning now to the And element B5, it will be noted that this And element has two inputs. One of these inputs is derived from the bus 215 and the conductor L2. Since the make contacts 58a are closed only when the elevator car is set for down travel, it follows that the And element B5 can be energized to produce an output only when the elevator car is set for down travel.

The second input for the And element B5 is derived from the output of the Memory element F4 for the fourth floor. As will be pointed out below, this output is produced as the elevator car approaches the fourth floor during its down trip. At such a time the And element B5 is fully energized and produces an output signal which is applied through the Or element E5a to the resetting terminals of the Memory element F5. Consequently, the Memory element is reset and interrupts the energization which it has been supplying to the Delay element TD5. The Delay element in turn interrupts the output which it has supplied across the terminals G and a5.

The selector may be forced into synchronism or step with the elevator car at any desired landing or landings of the building served by the elevator car. In the present case it will be assumed that such forced synchronizing is effected at the top and bottom landings. Thus, when the elevator car is at the top landing, a switch 217 is operated to closed condition. This switch is open for all other positions of the elevator car. The switch 217 may be a mechanical switch which is biased to open condition and which is cam operated to closed condition as the elevator car reaches the top landing. Closure of the switch 217 connects an input of the Or element E5 across the conductors L1 and L2. Consequently, the Or element E5 applies an input to the operating terminals of the Memory element F5, and the Memory element consequently must produce an output indicating that the elevator car is at the top landing.

When the elevator car reaches the bottom landing the switch 219 is closed to connect input terminals of the Or element E5a across the conductors L1 and L2. Consequently, the Or element applies a resetting input to the Memory element F5. The switch 219 may be biased to open condition and may be cam operated to closed condition as the elevator car reaches the bottom landing.

It will be understood that the synchronizing signals supplied by the switches 217 and 219 are not essential, but they are deemed advisable to insure synchronized operation of the selector.

The group of elements in the selector which are associated with the fourth landing include the And elements A4, C4, D4 and B4, the Or elements E4 and E4a, the Memory element F4 and the Delay element TD4.

The And element A4 receives three inputs. One of the inputs is derived from the buses 209 and 211 which supply notching signals. A second input is derived from the conductor L2 and the bus 213 which is connected to the conductor L1 only while the elevator car is set for up travel. Consequently, the And element A4 is effective only during up travel of the elevator car. The last input and for the And element A4 is derived from the output of the Delay element for the next landing below, in this case the Delay element TD3 for the third landing.

The And element C4 also has three inputs. One of these inputs is derived from the buses 209 and 211 which supply a notching signal. The second input is derived from the conductor L2 and the bus 215 which is connected to the conductor L1 only during down travel of the elevator car. Consequently, the And element C4 is effective only during down travel of the elevator car. The last input for the And element C4 is obtained from the output of the Delay element for the next landing above, in this case the Delay element TD5.

The outputs of the And elements A4 and C4 are applied through the Or element E4 to the operating input terminals of the Memory element F4. The output of the Memory element F4 supplies a signal to an And element for the next landing above, in this case the And element B5 which is employed for resetting purposes. The output also is applied to an And element for the next landing below, in this case the And element B3 which is employed for resetting purposes. Finally, the output is also applied to the Delay element TD4 which produces an output signal after expiration of the delay inherent therein. This output signal is in the form of a voltage which appears between the common terminal G and the terminal a4. The output voltage of the Delay element TD4 additionally is applied to an And element for the next landing above, in this case the And element A5. The output also is applied to an And element for the next landing below, in this case the And element C3 for the third landing.

The And elements D4 and B4 are employed for controlling the resetting of the Memory element F4. The And element D4 receives two inputs. One of the inputs is obtained from the conductor L2 and the bus 215 which is connected to the conductor L1 only while the elevator car is set for down travel. Consequently, the And element D4 is effective for initiating a resetting operation only while the elevator car is set for down travel.

The second input for the And element D4 is derived from the output of the Memory element for the next landing below, in this case the Memory element F3.

The And element B4 also has two inputs, one of which is derived from the conductor L2 and the bus 213 which is connected to the conductor L1 only while the elevator car is set for up travel. Consequently, the And element B4 can initiate a resetting operation of the Memory element F4 only while the elevator car is set for up travel. The second input to the And element B4 is obtained from the output of the Memory element for the next landing above, in this case the Memory element F5.

The outputs of the And elements D4 and B4 are coupled to the reset terminals of the Memory element F4 through the Or element E4a. Consequently, either of the And elements is effective for initiating a resetting operation of the Memory element.

As previously pointed out, the selector is forced into synchronism when the elevator car is adjacent either the top landing or the bottom landing. Such synchronizing for the intermediate landing elements of the selector is initiated by a switch 221 which is closed only when the elevator car is adjacent the top landing or the bottom landing. The switch 221 may be biased to open condition and may be cam operated to close when the elevator car is adjacent either the top landing or the bottom landing. When the switch 221 is closed a third input for the Or element E4a is obtained from the conductors L1 and L2. Consequently, should the Momory element F4 happen to be in operated condition when the elevator car arrives at either the top landing or the bottom landing, closure of the switch 221 would force a resetting of the Memory element F4.

Similar elements are employed for each of the intermediate landings and are similarly associated with elements for adjacent landings. Corresponding elements for all of the intermediate landings are identified by the same reference letter or letters followed by numerals indicating respectively the specific landings with which the elements are associated. For example, the elements A4, A3 and A2 are similar And elements respectively for the fourth, third and second landings. The elements for the second and third landings together with their connections are clearly shown in Figs. 1 and 1A and will be understood from the description of the corresponding elements for the fourth landing.

For the bottom landing the selector requires only the And elements C1 and D1, the Or elements E1 and E1a, the Memory element F1 and the Delay element TD1. The And element C1 has three inputs, one of which is obtained from the notching signal buses 209 and 211. A second input is derived from the conductor L2 and the bus 215, which is connected to the conductor L1 only while the elevator car is set for down travel. The third input for the And element C1 is obtained from the Delay element for the next landing above, in this case the Delay element TD2.

The output of the And element C1 is applied through the Or element E1 to the operating terminals of the Memory element F1 to produce an output which is supplied to the And element D2. In addition, the output is supplied to the Delay element TD1 which produces an output voltage appearing between the ground terminal G and the terminal a1. A voltage supplied by the Delay element TD1 also is applied to the And element A2.

When the elevator car reaches the bottom landing, a switch 223 closes to connect input terminals of the Or element E1 across the conductors L1 and L2. Should the And element C1 fail to initiate an operation of the Memory element F1, closure of the switch 223 would assure the desired operation. The switch 223 is biased to open condition and is cam operated to close as the elevator car reaches the bottom landing.

Resetting of the Memory element F1 is initiated by the And element D1 which receives two inputs. One of the inputs comes from the conductor L2 and the bus 213 which is connected to the conductor L1 only while the elevator car is set for up travel. The second input for the And element is derived from the Memory element F2 for the second landing. The output of the And element D1 is applied through the Or element E1a to the reset terminals of the Memory element F1.

To assure a resetting operation of the Memory element F1, a switch 225 may be employed for connecting a second set of input terminals of the Or element E1a across the conductors L1 and L2. This switch is biased to open condition and is cam operated to close when the elevator car reaches the top landing.

In order to make certain that the operation of the selector illustrated in Figs. 1 and 1A is fully understood, the progressive operation thereof now will be discussed. It will be assumed that the elevator car initially is at the bottom landing. Consequently, the switches 219, 221 and 223 are all closed. Since the switch 219 is closed, an input is supplied from the conductors L1 and L2 through the Or element E5a for the fifth landing to the reset terminals of the Memory element P5. Consequently, the Memory element P5 must be in reset condition.

The closed switch 221 applies inputs through the Or elements E2a, E3a and E4a, respectively, to the reset terminals of the Memory elements F2, F3 and F4. Consequently, all of these Memory elements must be in reset condition. Inasmuch as the switch 223 is closed, an input is supplied through the Or element E1 to the operating terminals of the Memory element F1. Consequently, the Memory element F1 must be in operated condition supplying voltages to the And element D2 for the second landing and the Delay element TD1 for the bottom landing. It will be assumed that the delay of the Delay element TD1 has expired and that an output voltage appears thereacross which is supplied to the And element A2 for the second landing and which also appears between the common terminal G and the terminal a1.

Under the assumed conditions the elevator car is set for up travel, and the contacts 57a consequently are closed to connect the bus 213 to the conductor L1. As a result, inputs are supplied to all of the And elements D1, B2 to B4 and A2 to A5.

It will be assumed that the elevator car starts in the up direction. As the elevator car passes the inductor plate 71 located between the first and second landings, the notching inductor relay 63a operates to open its contacts 67a. The opening of these contacts interrupts the input to the Not element 201 and this element supplies an input to the operating terminals of the Memory element 203. The Memory element now applies a voltage or notching signal to the buses 209 and 211 and also applies a voltage to the Delay element 205. The Delay element 205 starts to time out.

The notching signal applied to the buses 209 and 211 is supplied to the And elements C1 to C4 and A2 to A5. However, it will be recalled that none of these And elements can produce an output until inputs are supplied to all input terminals of such And element.

As the elevator car leaves the bottom landing the switches 219, 221 and 223 open to interrupt the operating input to the Memory element F1 and to interrupt the reset inputs supplied to the Memory elements F2 to F5. However, the Memory elements remain in their respective conditions.

When the previously mentioned notching signal appears, the only And element which is fully energized is the And element A2 for the second landing. It will be recalled that this And element receives not only the notching signal from the buses 209 and 211, but it also receives an input from the conductor L2 and the bus 213 representing the up direction of travel of the elevator car, and it receives the third input from the Delay element TD1 which is still energized. Consequently, the And element A2 produces an output which is applied through the Or element E2 to the Memory element F2. The Memory element now produces an output voltage which is applied to the Delay element TD2 and this Delay element starts to time out. In addition, the output of the Memoary element F2 is applied to the And element D3 without immediate effect on the operation of the system.

Finally, the output of the Memory element F2 is applied to the And element D1 for the bottom landing. Since this element D1 also is receiving an input from the conductor L2 and the bus 213, it now produces an output which is applied through the Or element E1a to the reset terminals of the Memory element F1, and this Memory element consequently resets to interrupt the energization therefrom of the And element D2 and the Delay element TD1. Consequently, the voltage output of the Delay element TD1 no longer appears at the And element A2 or between the terminals G and a1. Although the And element A2 no longer produces an output, the Memory element F2 remains in operated condition.

The Delay element 205 now times out and applies an output to the operating terminals of the Memory element 207. Consequently the Memory element operates to apply a resetting voltage to the Memory element 203. The Memory element 203 consequently resets and interrupts the notching signals applied to the buses 209 and 211 and the energization through the Delay element 205 of the Memory element 207. As the elevator car motion continues, the notching inductor relay 63a passes its associated inductor plate and recloses the break contacts 67a to reenergize the Not element 201 and to reset the Memory element 207. Consequently the Not element output is interrupted. The interruption of the notching signal has no immediate effect on the operation of the system.

The delay of the Delay element TD2 now expires and a voltage output is obtained which appears between the common terminal G and the terminal a2. Consequently, as the elevator car moved from the bottom landing towards the second landing, the voltage appearing between the terminals G and a1 is transferred to the terminals G and a2. In addition, the Delay element TD2 applies voltages to the And elements C1 and A3 without immediate effect on the operation of the system.

As the elevator car A continues its upward motion, the notching inductor relay 63a reaches the inductor plate 72 located between the second and third landings. Consequently, the break contacts 67a open and initiate another notching signal between the buses 209 and 211 by the sequence previously described. The only And element which is now completely energized is the And element A3 for the third landing. This And element not only receives the notching signal but it also receives a direction input from the conductor L2 and the bus 213 and it receives an input from the Delay element TD2. The And element A3 therefore produces an output which is applied through the Or element E3 to the Memory element F3. The Memory element F3 applies a voltage to the Delay element TD3 which starts to time out. Also a voltage is applied to the And element D4 without immediate effect on the operation of the system. Finally, the Memory element F3 applies a voltage to the And element B2 for the second landing.

Since it also receives a direction input from the conductor L2 and the bus 213, the And element B2 now is fully energized and applies through the Or element E2a a voltage to the reset terminals of the Memory element F2. Consequently, the Memory element F2 interrupts the energization of the Delay element TD2 and the voltage across the terminals G and a2 disappears. In addition the energization of the And elements C1 and A3 from the Delay element TD2 are discontinued at this time. The Memory element F2 also removes the voltages applied to the And elements D1 and D3 without immediately affecting the operation of the system.

The Delay element 205 now times out and the notching signal to the buses 209 and 211 is interrupted by the sequence previously described. Furthermore, the continued motion of the elevator car results in reclosure of the break contacts 67a to complete the resetting of the elements 201 and 207 by the sequence previously discussed.

Next the Delay element TD3 times out and supplies a voltage which appears between the terminals G and a3. Consequently, the movement of the elevator car from the bottom landing has resulted in the stepping of the voltage from the terminals G and a1 to the terminals G and a2 and finally to the terminals G and a3.

The output of the Delay element TD3 also is applied to the And elements C2 and A4 without immediate effect on the operation of the system.

The elevator car now continues its upward travel until it reaches the inductor plate 73 which is located between the third and fourth landings. The resultant opening of the break contacts 67a produces a notching signal between the buses 209 and 211 by the sequence previously discussed. The only And element which now is fully energized is the And element A4 for the fourth landing. This And element not only receives the notching signal but it receives the direction signal from the conductor L2 and the bus 213. In addition, it receives the output voltage of the Delay element TD3.

Since it is fully energized, the And element A4 applies through the Or element E4 an operating voltage to the Memory element F4. The Memory element supplies an input to the Delay element TD4 which starts to time out. In addition, voltage is applied by the Memory element to the And element B5 without immediate effect on the operation of the system. The Memory element F4 also supplies an input to the And element B3. Inasmuch as the element B3 also is energized by a direction signal from the conductor L2 and the bus 213, it follows that this And element energizes the reset terminals of the Memory element F3 through the Or element E3a. The Memory element F3 deenergizes the Delay element TD3 and consequently the voltage appearing between the terminals G and a3 disappears. In addition, the Memory element F3 removes voltage from the And elements D4 and B2 without immediately affecting the operation of the system.

The notching signal appearing between the buses 209 and 211 now disappears and the reclosure of the break contacts 67a completes the resetting operation of the elements which produce the notching signal in the manner previously described.

The Delay element TD4 next times out and applies a voltage between the terminals G and a4. In addition, the Delay element applies voltages to the And elements A5 and C3 without immediately affecting the operation of the system.

The continued motion of the elevator car in the up direction next brings the notching inductor relay 63a adjacent the inductor plate 74 which is located between the fourth and fifth landings. Consequently, the break contacts 67a open to initiate a notching signal between the buses 209 and 211 by the sequence previously discussed. The only And element which now is fully energized is the And element A5. This receives not only the notching signal, but the direction signal from the conductor L2 and the bus 213. It will be recalled that the And element A5 also is energized through the Delay element TD4. As a result of its complete energization, the And element A5 supplies an operating voltage to the Memory element F5 through the Or element E5. The Memory element F5 initiates a timing-out operation of the Delay element TD5. In addition, the Memory element supplies a voltage to the And element B4. Inasmuch as the And element B4 also is energized from the conductor L2 and the bus 213, it applies through the Or element E4a a resetting voltage to the Memory element F4. In resetting, the Memory element interrupts the energization of the Delay element TD4 and consequently removes voltage from the terminals G and a4. The Delay element discontinues its energization of the And elements A5 and C3. Although the And element A5 discontinues its output the Memory element F5 remains in operated condition. The Memory element F4 in resetting also removes voltage from the And elements B5 and B3 without affecting the immediate operation of the system.

The notching signal appearing between the buses 209 and 211 now is interrupted and the break contacts 67a reclose to complete the resetting of the notching-signal-producing elements by the sequence previously discussed.

The Delay element TD5 times out and applies a voltage which appears between the terminals G and a5. In addition, the voltage appears at the And element C4 without immediate effect on the operation of the system.

As the elevator car reaches the fifth landing the switch 217 closes to energize the Memory element F5 through the Or element E5. Consequently, if the Memory element had failed to receive an operating input, the closure of the switch 217 would have assured operation of the Memory element. In addition, the switches 221 and 225 close. Consequently, if any of the Memory elements F1 to F4 had failed to receive a resetting voltage, it would receive such voltage upon closure of the switches 221 and 225.

As the elevator car reaches the fifth landing and prepares for a down trip, the make contacts 57a open to disconnect the bus 213 from the conductor L1. This removes the up direction signal from the associated And elements. In addition, the make contacts 58a close to connect the bus 215 to the conductor L1. Such connection applies a down direction signal to the And elements B5, C1 to C4 and D2 to D4.

From the foregoing discussion it is clear that as the elevator car moves from the bottom to the top landing, voltages appear successively across the terminals G and a1, G and a2, G and a3, G and a4, G and a5. These voltages can be employed for controlling operations of the elevator system in manners which will be discussed below.

The elevator car now starts in the down direction. As the car leaves the fifth landing the switches 217, 221 and 225 open without immediate effect on the operation of the system.

As the notching inductor relay 63a reaches the inductor plate 74 located between the fifth and fourth landings, the opening of the break contacts 67a initiates a notching signal which appears between the buses 209 and 211 by the sequence previously discussed. The only And element which is now fully energized is the And element C4. This element not only receives the notching signal but it also receives the direction signal from the conductor L2 and the bus 215. In addition, it receives an input from the Delay element TD5.

The output of the And element C4 is applied through the Or element E4 to the Memory element F4. This Memory element consequently operates to apply a voltage to the Delay element TD4 and the Delay element starts to time out. In addition, a voltage is applied to the And element B3 without immediate effect on the operation of the system. Finally, the Memory element F4 applies a voltage to the And element B5. Inasmuch as the And element B5 is also energized by the direction signal appearing between the bus 215 and the conductor L2, it supplies energization through the Or element E5a to the resetting terminals of the Memory element F5. The Memory element consequently resets to remove voltage from the Delay element TD5 and from the terminals G and a5. The Memory element also removes voltage from the And element B4 without immediate effect on the operation of the system. The deenergization of the Delay element TD5 removes voltage from the And element C4 without immediate effect on the operation of the system.

The notching signal appearing between the buses 209 and 211 now terminates and the downward motion of the elevator car results in reclosure of the break contacts 67a to complete the resetting of the notching signal elements by the sequence previously discussed.

Next the delay of the Delay element TD4 expires and voltage consequently appears between the terminals G and a4. Voltage also is applied to the And elements A5 and C3 without immediate effect on the operation of the system.

The continued motion of the elevator car in the down direction brings the inductor relay 63a adjacent the inductor plate 73 located intermediate the third and fourth landings. This results in opening of the break contacts 67a to initiate a notching signal by the sequence previously discussed.

The only And element which now is completely energized is the And element C3 for the third landing. This element receives not only the notching signal but also the direction signal from the conductor L2 and the bus 215. Inasmuch as the And element also is energized from the Delay element TD4, and And element supplies through the Or element E3 an operating voltage to the Memory element F3. The Memory element applies a voltage to the Delay element TD3 which starts to time out. In addition, voltage is supplied to the And element B2 without immediate effect on the operation of the system. Finally, the Memory element F3 applies a voltage to the And element D4. Inasmuch as the And element D4 also receives a direction signal from the conductor L2 and the bus 215, energization is supplied through the Or element E4a to the reset terminals of the Memory element F4. In resetting, the Memory element F4 removes voltage from the Delay element TD4 and from the terminals G and a4. In addition, voltage is removed from the And elements A5, C3, B5 and B3 without immediately affecting the operation of the system. Although the output of the And element C3 is interrupted, the Memory element F3 remains in operated condition.

The notching signal now terminates and the motion of the elevator car results in reclosure of the break contacts 67a to complete the resetting of the elements which produce the notching signal.

The Delay element TD3 times out and applies a voltage between the terminals G and a3. In addition, voltage is supplied to the And elements A4 and C2 without immediate effect on the operation of the system.

The elevator car continues its downward motion and the notching inductor relay 63a ultimately reaches the inductor plate 72 located between the second and third landings. This results in production of a notching signal between the buses 209 and 211 by the sequence previously discussed.

The only And element which now is fully energized is the And element C2 associated with the second landing. This And element not only receives the notching signal, but it receives a direction signal from the conductor L2 and the bus 215. It will be recalled that the element C2 also is energized from the Delay element TD3.

The And element C2 operates through the Or element E2 to energize the operating terminals of the Memory element F2. The Memory element supplies a voltage to the Delay element TD2 which starts to time out. In addition, voltage is applied to the And element D1 without immediate effect on the operation of the system. Finally, voltage is applied to the And element D3. Inasmuch as the And element D3 also receives a direction signal from the bus 215 and the conductor L2, it energizes the reset terminals of the Memory element F3 through the Or element E3a. The Memory element F3 now removes voltage from the Delay element TD3 and the terminals G and a3. At the same time energization of the And elements A4 and C2 from the Delay element is terminated. Despite interruption of the output of the And element C2, the Memory element F2 remains operated. The Memory Element F3 also removes voltage from the And elements D4 and B2 without immediate effect on the operation of the system.

The notching signal now terminates and the contacts 67a reclose to complete the resetting of the elements producing the notching signal by the sequence previously discussed.

Next, the Delay element TD2 times out and applies a voltage to the terminals G and a2. In addition, voltage is applied to the And elements A3 and C1 without immediate effect on the operation of the system.

The continued motion of the elevator car in the down direction brings the notching inductor relay 63a adjacent the inductor plate 71 which is located intermediate the first and second landings. Consequently, the break contacts 67a open to initiate a notching signal by the sequence previously discussed.

The only And element which is now completely energized is the And element C1. This element receives not only the notching signal but a direction signal which is obtained from the conductor L2 and the bus 215. It will be recalled that the element C1 also is energized from the Delay element TD2.

Energization from the And element C1 is supplied through the Or element E1 to the operating terminals of the Memory element F1. This element applies a voltage to the Delay element TD1 which starts to time out. In addition, voltage is applied to the And element D2. This element also is energized from the conductor L2 and the bus 215. Consequently, a voltage is supplied from this element through the Or element E2a to the resetting terminals of the Memory element F2. The resetting of the Memory element removes voltage from the Delay element TD2 and from the terminals G and a2. In addition, voltage is removed from the And elements A3 and C1 without immediate effect on the operation of the system. It will be recalled that output from the And element C1 is not required to maintain the Memory element F1 in operated condition.

The notching signal now is terminated and the break contacts 67a reclose to complete the resetting of the elements associated with the notching signal.

Next the delay of the Delay element TD1 expires and a voltage is applied from the Delay element to the terminals G and a1. The element also applies a voltage to the And element A2 without immediate effect on the operation of the system.

As the elevator car reaches the bottom landing the switches 219, 221 and 223 close. If any of the Memory elements F2 to F5 had failed to receive a resetting voltage, the closure of the switches 221 and 219 would supply such a voltage through the associated Or elements. If the memory element F1 has failed to receive an operating voltage, closure of the switch 223 would apply such a voltage through the Or element E1. Consequently, these switches assure synchronizing of the selector with car position.

From the foregoing discussion it will be appreciated that as the elevator car leaves the bottom landing and proceeds towards the top landing, voltages appear successively between the terminals G and a1, G and a2, G and a3, G and a4, G and a5. As the elevator car returns to the bottom landing, voltages successively appear between the terminals G and a5, G and a4, G and a3, G and a2, G and a1. Consequently, these voltages indicate car position, and may be employed for controlling the operation of the elevator system in a manner which now will be considered.

Figure 2:
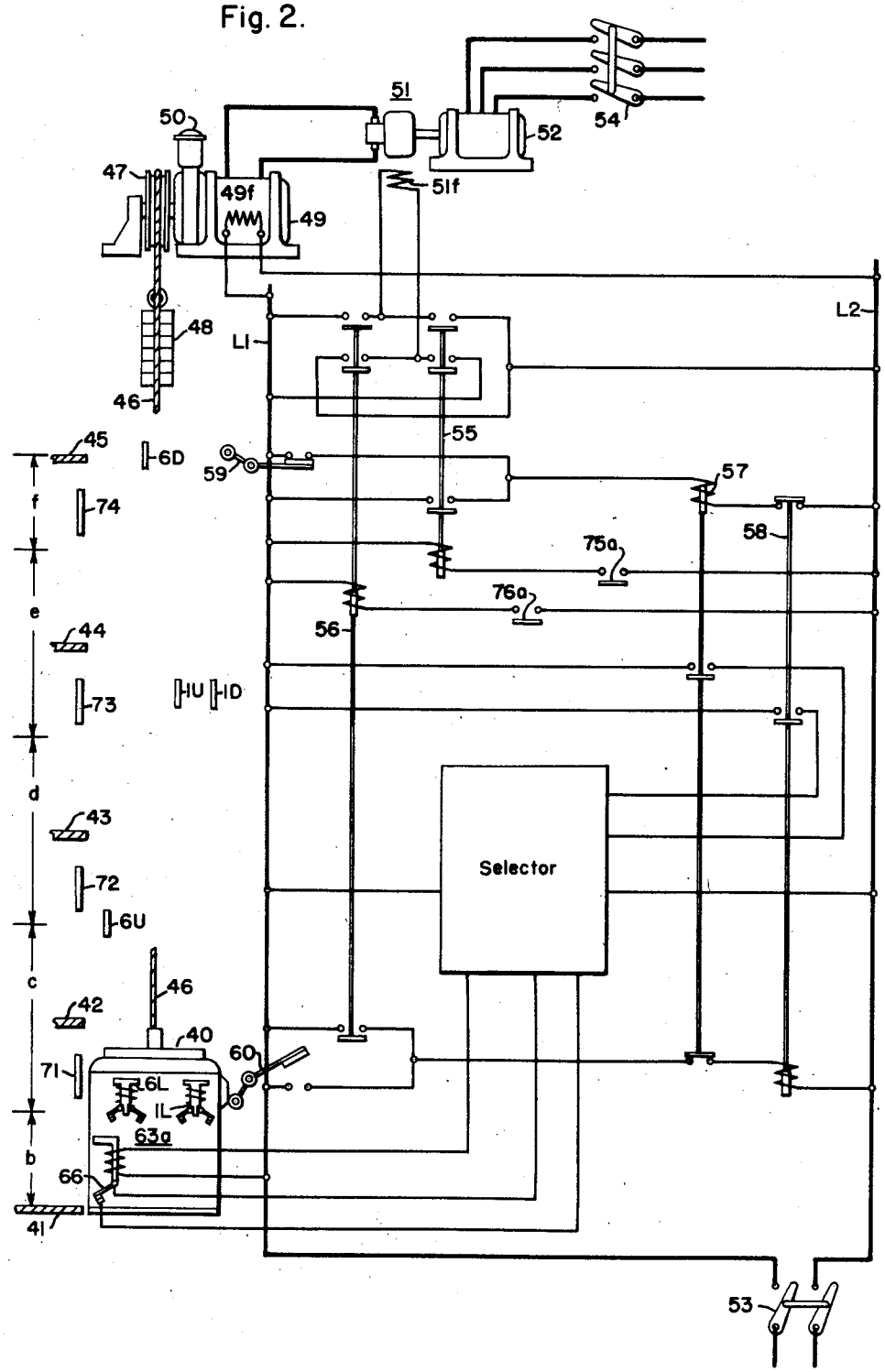
Figs. 2, 3 and 4 are schematic views of an elevator system embodying the invention.
Figure 3:
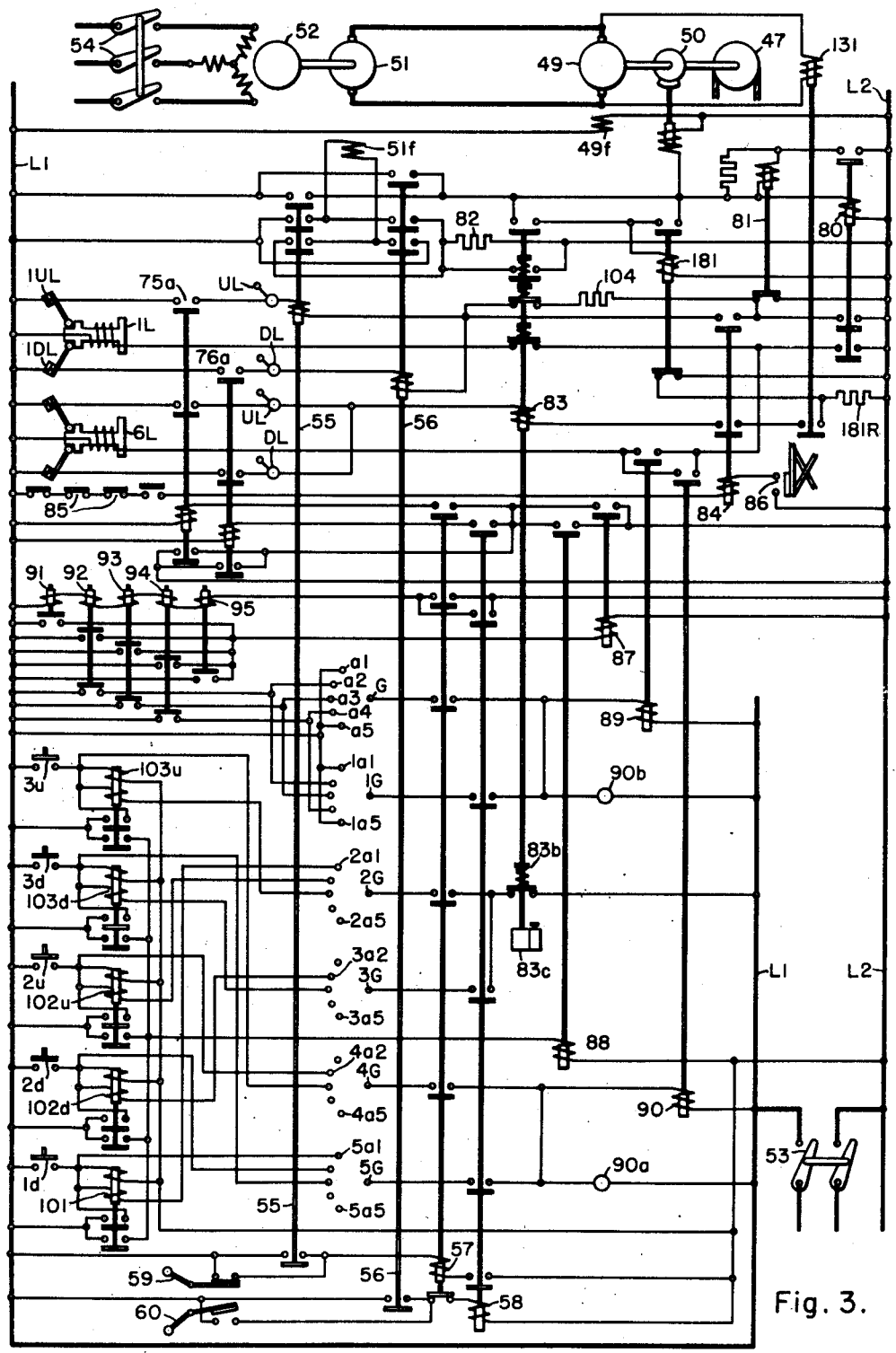
Figure 4:
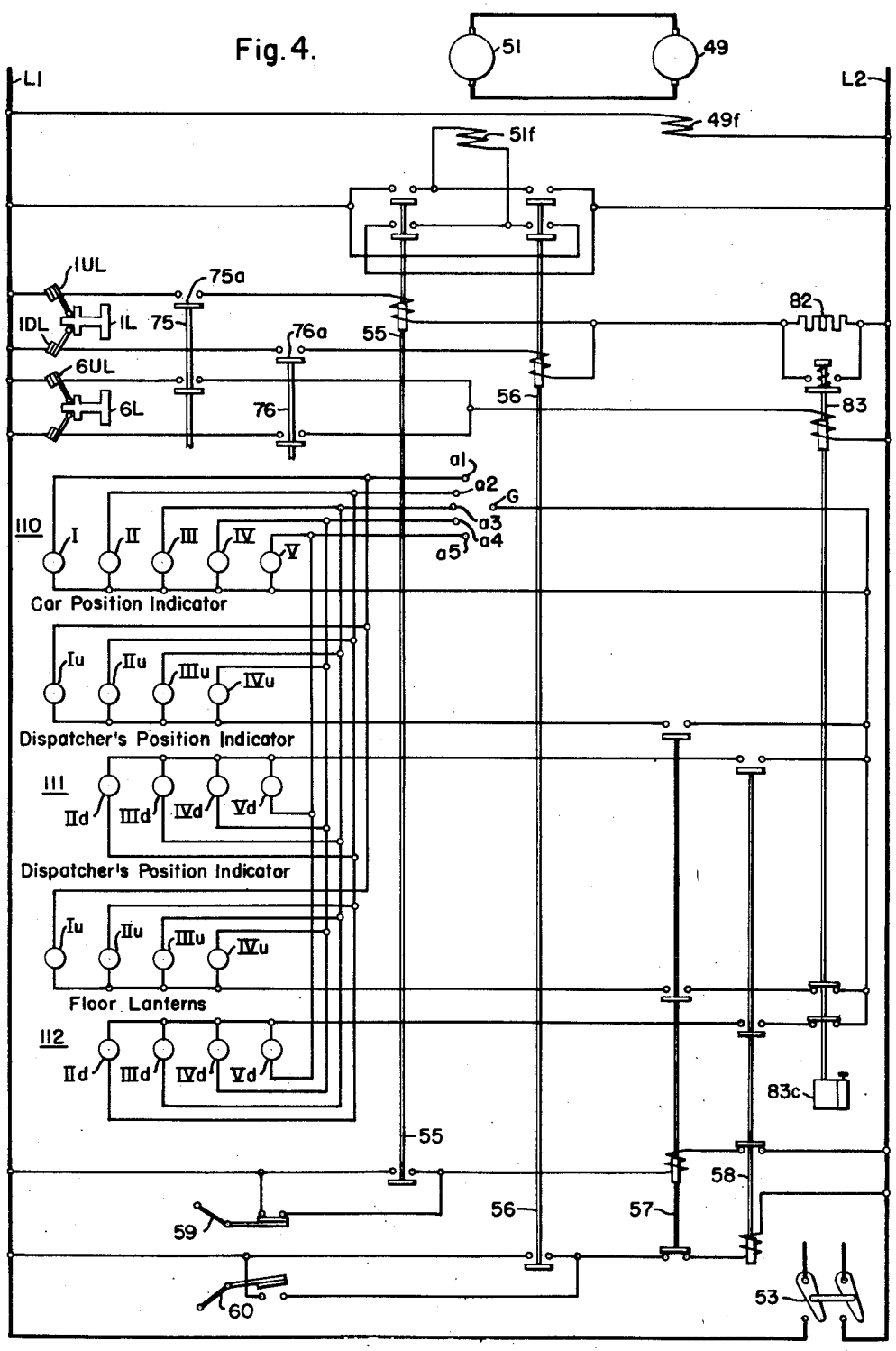

*Figures 2, 3 and 4*

In order to simplify the presentation of the invention, it is assumed that the selector of Figs. 1 and 1A is employed in the elevator system shown in Figs. 2, 3 and 4 of the Lewis Patent 1,981,601 in place of the electromechanical notching selector illustrated in Fig. 1 of the Lewis patent. To this end, Figs. 2, 3 and 4 of the Lewis patent are here reproduced as Figs. 2, 3 and 4 with only the minimum number of changes needed to illustrate the substitution of the present selector for the selector disclosed by Lewis. In order to facilitate a consideration of the figures, the following components which are common to the system of the Lewis patent and the present system are listed as follows:

40—elevator car
51—generator
49—elevator motor
55—up direction switch
56—down direction switch
57—up interlock relay
58—down interlock relay
71–74—inductor plates
6L—inductor relay
1L—inductor relay
75—up relay
76—down relay
83—speed relay
84—door relay
91–95—pushbutton switches, car calls
87—starting relay, car calls
89—stopping relay, car calls
88—starting relay, hall calls
90—stopping relay, hall calls
101–102D, 102U, 103U—floor relays
1d, 2d, 2u, 3d, 3u—pushbuttons, corridor
131—voltage responsive relay It will be recalled that to simplify the presentation of the invention it is assumed that the inductor plate 70 of the Lewis patent is omitted and that the spacing between the first and the second landings is equal to that between each other pair of successive landings. It will be recalled further that the notching inductor relay of the Lewis patent is replaced by the notching inductor relay 63a, which operates break contacts 67a in place of the make contacts 67 shown in the Lewis patent.

By comparison of the present Fig. 2 with Fig. 2 of the Lewis patent, it will be noted that the relays 61 and 62 of Lewis are not here reproduced, and that the selector M of the Lewis patent also is omitted.

In the Lewis patent, Fig. 3, one terminal of each of the coils of the relays 89 and 90, one terminal of each of the lamps 90b and 90a and one terminal of one of the contact members 83b are connected to the conductor L2. In the present Fig. 3, these terminals are connected to the conductor L1.

Comparison of the present Fig. 3 with Fig. 3 of the Lewis patent also will show that the contact arm 20 employed in the Lewis patent here is replaced by the terminal G. Furthermore, each of the terminals $a1$, $a2$, $a3$, $a4$ and $a5$ of Figs. 1 and 1A replaces one of the contact members of the Lewis patent which had been associated with the contact arm 20. The effect of this substitution now will be considered.

Let it be assumed that a car call is registered by operation of the pushbutton switch 92. When the car nears the second floor a voltage appears between the terminals G and $a2$ in the manner discussed with reference to Figs. 1 and 1A. If it is assumed that the elevator car is traveling up, the up interlock relay 57 is picked up. Consequently, when the voltage appears between the terminals G and $a2$, an energizing circuit for the stopping relay 89 is completed which may be traced from the terminal $a2$ through the lower set of contacts of the pushbutton switch 92, the conductor L1, the coil of the stopping relay 89, and make contacts of the up interlock relay 57 to the terminal G. Consequently, the stopping relay 89 is picked up to stop the elevator car at the second floor in the manner described in the aforesaid Lewis patent. In a like manner, operation of the pushbutton switches 93 and 94 would result in energization of the stopping relay 89 by voltages appearing between the terminals G and $a3$ and G and $a4$, respectively, as the elevator car during its up trip approached the third and fourth floors respectively.

A selector similar to that illustrated in Figs. 1 and 1A may replace each of the arms 21 to 25 in Fig. 3 of the Lewis patent. Such selectors are represented in the present Fig. 3 by terminals $a1$ to $a5$ and G to which the prefixes 1, 2, 3, 4 and 5 are added to indicate that they are associated with additional selectors. However, the circuits may be arranged to permit a single selector similar to that illustrated in Figs. 1 and 1A to perform a number of different functions. Such an arrangement of circuits will be considered in connection with Fig. 4.

The present Fig. 4 corresponds to Fig. 4 of the Lewis patent except for the omission of the electromechanical selector M of the Lewis patent and the different circuit connections of the car position and dispatcher position indicators and of the floor lanterns. The new connections are clearly illustrated in the present Fig. 4 and can be followed through the following discussion of typical operations.

Let it be assumed that the elevator car is adjacent the bottom landing. Under such circumstances, a voltage appears between the terminals G and $a1$ for the reasons set forth in the discussion of Figs. 1 and 1A. By reference to Fig. 4 it will be noted that this voltage energizes the car position indicator for the buttom landing through a circuit which may be traced from the terminal $a1$ through lamp I of the car position indicator to the terminal G. Consequently, the lamp is illuminated to indicate that the elevator car is at the first landing. In an analogous manner, when the elevator car is at the second landing a voltage appears between the terminal G and $a2$ to illuminate the lamp II. When the elevator car is at the third landing a voltage appears between the terminals G and $a3$ to illuminate the lamp III. At the fourth and fifth landings, voltages appear at the appropriate terminals to illuminate the lamps IV and V.

The dispatcher position indicators are divided into up lamps and down lamps. If the elevator car is at the bottom landing and is set for up travel, the interlock relay 57 is picked up. In addition, a voltage appears between the terminals G and $a1$ for the reasons discussed in connection with Figs. 1 and 1A. Thus, a voltage is applied to the up lamp for the first floor which may be traced from the terminal $a1$ through the lamp I$u$, the upper set of contacts for the relay 57 in Fig. 4 to the terminal G. As the elevator car reaches the second floor a voltage appears between the terminals G and $a2$ in the manner set forth in the discussion of Figs. 1 and 1A. This voltage is applied across the lamp II$u$ through the upper set of contacts of the relay 57. If the car continues its motion, voltages appear successively across the terminal G and the terminals $a3$ and $a4$ which are applied successively to the lamps III$u$ and IV$u$ through the upper set of contacts of the relay 57.

If the elevator car is at the top landing and is set for down travel, a voltage appears between the terminals G and $a5$. In addition, the down interlock relay 58 is picked up. Consequently, the voltage is applied through the upper set of contacts of the relay 58 to the lamp V$d$ which indicates that the elevator car is at the top landing and is set for down travel. As the elevator car travels down, voltages appear successively between the terminal G and the terminals $a4$, $a3$ and $a2$ which are applied successively to the dispatcher position indicator down lamps IV$d$, III$d$ and II$d$ for the fourth, third and second landings through the upper set of contacts of the relay 58.

If the elevator car is at the bottom landing and is set for up travel, the relay 57 is picked up, and if the relay is stopped at such landing, the speed relay 83 is dropped out. (The relay 83 has intermediate and lowest sets of contacts which are break contacts.) Under such circumstances, a voltage appears between the terminals G and $a1$ which is applied to the floor lantern I$u$ through the intermediate set of contacts of the relay 83 in Fig. 4 and the lower set of contacts of the relay 57. As the elevator car stops successively at the second, third and fourth floors on its way up, voltages appear successively between the terminals G and $a2$, $a3$ and $a4$, which are applied successively to the lamps II$u$, III$u$ and IV$u$ through the intermediate set of contacts of the relay 83 and the lower set of contacts of the relay 57.

If the elevator car is stopped at the top landing, the relay 83 is dropped out. If the car is set for down travel, the down interlock relay 58 is picked up. Inasmuch as a voltage appears between the terminals G and $a5$ under these circumstances, the voltage is applied to the floor lantern V$d$ through the intermediate set of contacts of the relay 58 and the lowest set of contacts of the relay 58 in Fig. 4. As the elevator car stops successively during its down trip at the fourth, third and second floors, voltages appear successively between the terminals G and $a4$, $a3$ and $a2$ which are respectively applied to the floor lanterns IV$d$, III$d$ and II$d$ through the intermediate set of contacts of the relay 58 and the lowest set of contacts of the relay 83.

Figure V

Figs. 1 and 1A illustrate one embodiment of a selector employing static elements. However, other embodiments employing different arrangements of the static elements are possible. For example, in the modification of Figs. 1 and 1A Delay elements TD1 to TD5 are employed for delaying the appearance of a voltage indicating that the elevator car is approaching a landing until the indication has been canceled for the landing which the elevator car has just left. This prevents interference between the two indications.

Figure 5:
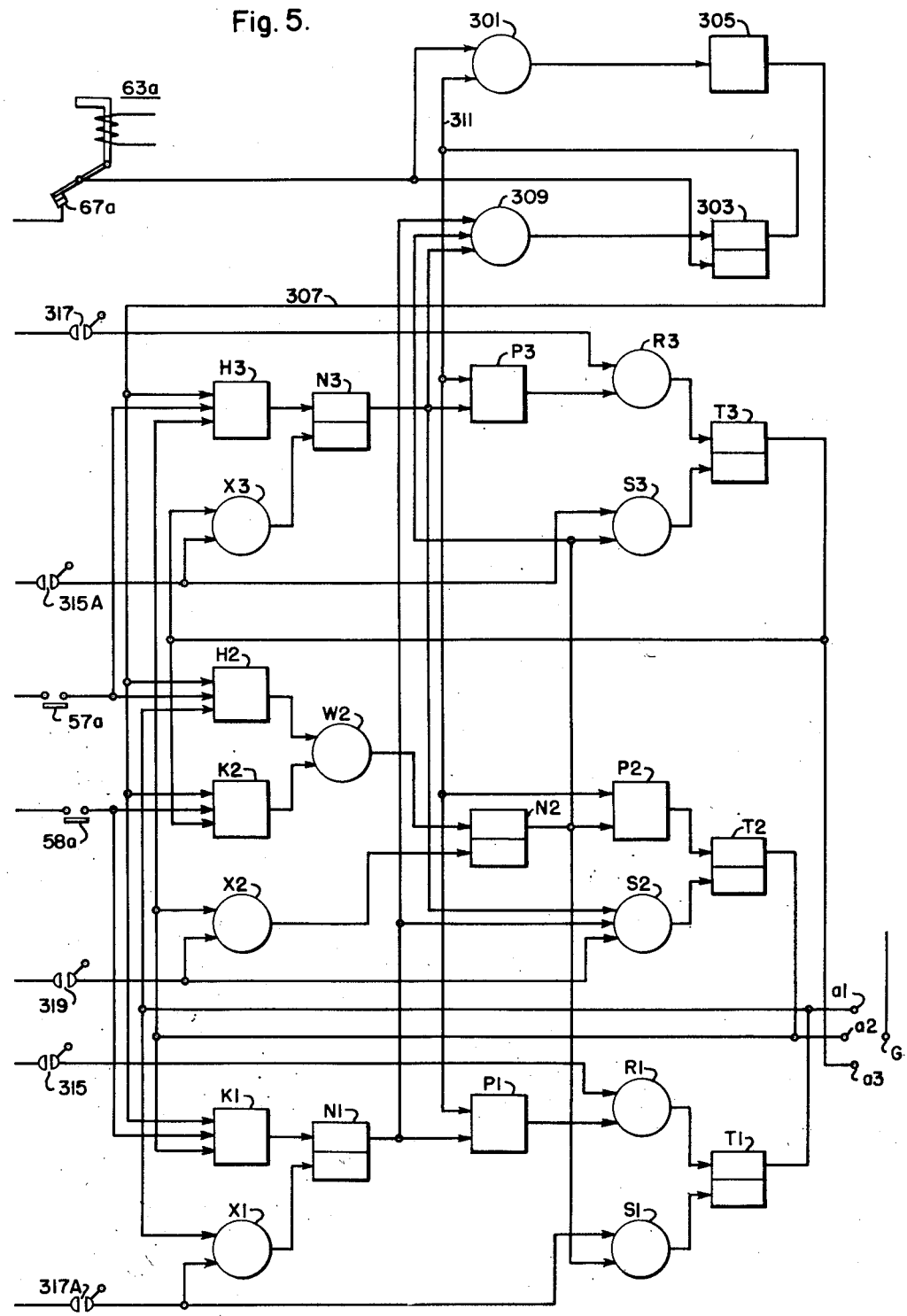
Fig. 5 is a schematic view showing a modified landing selector embodying the invention.

In the embodiment of Fig. 5, Delay elements are not employed. Interference is prevented by producing in succession two notching signals. The first notching signal to be produced cancels the selector indication for the landing which the elevator car has just left. The second notching signal is effective for initiating the production of the next indicating signal for the landing which the elevator car is approaching.

In order to simplify the presentation of the embodiment of Fig. 5, it will be assumed that the selector therein shown is designed for a building having only first, second and third landings. The circuits for the selector are shown in single line form.

In the embodiment of Fig. 5, the notching inductor relay 63a again is employed. When the break contacts 67a are closed, energy is supplied therethrough to an Or element 301 and to the reset terminals of a Memory element 303. Inasmuch as the Or element is energized it supplies an output to a Not element 305 and this element consequently does not have an output signal.

When the break contacts 67a open, they interrupt the energization of the Not element 305 through the Or element 301. Consequently, the Not element produces an output signal which will be termed the first notching signal and applies this signal to a bus 307.

As will be explained below, the first notching signal applied to the bus 307 assists in performing a resetting operation of a Memory element in the selector. The resetting operation is accompanied by the application of a signal through an Or element 309 to the operating terminals of the Memory element 303. Consequently, this Memory element produces an output which is applied to a bus 311 and which will be referred to as the second notching signal. In addition, the Memory element 303 supplies through the Or element 301 an input to the Not element 305. Since the Not element 305 is now energized, the first notching signal produced thereby is terminated.

When the break contacts 67a again close, they supply energy through the Or element 301 to the Not element 305. In addition, energy is supplied through the contacts 67a to the reset terminals of the Memory element 303 and this Memory element resets to interrupt the second notching signal supplied to the bus 311. The Memory element 303 also discontinues its supply of energy through the Or element 301 to the Not element 305. However, since the Not element is now energized through the break contacts 67a, it still produces no output signal.

The make contacts 57a again are employed to provide a signal while the elevator car is set for up travel. The make contacts 58a are again employed to provide a signal while the elevator car is set for down travel.

The construction of the selector of Fig. 5 can best be set forth by describing an operation of the elevator car and introducing the various elements as required. It will be assumed initially that the elevator car is located at the bottom landing and that a Memory element T1 is in operated condition to apply a voltage between the terminals G and a1 to indicate the presence of the elevator car adjacent the first landing. The make contacts 57a are assumed to be closed, indicating that the elevator car is set for up travel.

When the inductor notching relay 63a during up travel of the elevator car reaches its associated inductor plate located between the first and second landings, the break contacts 67a of the notching inductor relay 63a open to interrupt the energization of the Not element 305 through the Or element 301. Consequently, a first notching signal is applied to the bus 307 and through the bus the signal is applied to And elements K1, K2, H2 and H3. The And elements are associated with the landings represented by the numerals employed in the reference characters for the And elements.

The only one of the And elements which is fully energized is the And element H2 for the second landing. This element not only receives the first notching signal, but it receives a signal through the make contacts 57a indicating that the elevator car is conditioned for up travel. Finally, the And element H2 receives a signal from the output of the Memory element T1.

As a result of its complete energization, the And element H2 energizes the operating terminals of a Memory element N2 through an Or element W2. The Memory element N2 in turn supplies energy to an And element P2. However, the And element is not fully energized at this stage. The Memory element N2 also applies a signal through the Or element S1 to the reset terminals of the Memory element T1. As a result of the reset of the Memory element T1, the voltage between the terminals G and a1 is terminated. In addition, the voltage supplied from the Memory element T1 to the reset terminals of the Memory element N1 through the Or element X1 is terminated without immediate effect on the operation of the system. The termination of the output of the Memory element T1 also terminates the output of the And element H2, but the Memory element N2 remains in operated condition.

Returning to the effect of operation of the Memory element N2, it should be noted that the Memory element supplies energization through the Or element S3 to the reset terminals of a Memory element T3 for the third landing. This has no immediate effect on the operation of the system.

At the same time, the Memory element N2 supplies energy through the Or element 309 to the operating terminals of the Memory element 303. Consequently, the Memory element 303 energizes the Not element 305 through the Or element 301, and the first notching signal produced by the Not element 305 consequently is terminated. In addition, the Memory element 303 delivers the second notching signal through the bus 311 to the And element P2.

The And element P2 now is completely energized and delivers a voltage to the operating terminals of the Memory element T2. In operating, the Memory element T2 delivers a voltage which appears between the terminals G and a2 to indicate that the elevator car is adjacent the second landing. The Memory element T2 also delivers energization to the And elements K1 and H3 without immediate effect on the operation of the system. Finally, the Memory element T2 energizes the reset terminals of the Memory element N2 through the Or element X2. As a result of the reset, the Memory element N2 interrupts the supply of energy therefrom to the Memory element T3 through the Or element S3, to the And element P2 and to the reset terminals of the Memory element T1 through the Or element S1. The And element P2 in turn no longer energizes the Memory element T2 but this element T2 continues to have an output. Consequently, the reset of the element N2 has no immediate effect on system operation.

As the elevator car continues its upward motion, the contacts 67a reclose to energize the reset terminals of the Memory element 303. This interrupts the second notching signals applied to the bus 311, but such interruption has no immediate effect on the operation of the system. In addition, the Memory element 303 discontinues its supply of energy through the Or element 301 to the Not element 305. However, the Not element 305 now is energized through the break contacts 67a and the Or element 301. Consequently, the Not element 305 does not produce an output.

As the elevator car continues its motion toward the third landing (in this case the top landing), the notching inductor relay 63a reaches the associated inductor plate located between the second and third landings. The resultant opening of the break contacts 67a interrupts the energization of the Not element 305 and this element consequently supplies the first notching signal to the bus 307. Under these circumstances, the only And element which is fully energized is the And element H3 for the top landing. This element additionally is energized through the make contacts 57a for the reason that the elevator car is set for up travel. A third input to the And element H3 is received from the operated Memory element T2.

Energy now is supplied to the operating terminals of the Memory element N3 from the And element H3, and the Memory element N3 operates to energize the And element P3. However, the And element P3 is not fully energized at this time.

The Memory element N3 also energizes the reset terminals of the Memory element T2 through the Or element S2. Consequently, the Memory element T2 resets to terminate the voltage appearing between the terminals G and a2. The Memory element T2 also interrupts the supply of energy therefrom to the And elements K1 and H3. This has no immediate effect on the operation of the And element K1, but the And element H3 is no longer fully energized and interrupts its supply of energy to the Memory element N3. However, the Memory element N3 continues in its operated condition.

The Memory element T2 also interrupts the supply of energy to the reset terminals of the Memory element N2 through the Or element X2 without immediate effect on the operation of the system.

Returning to the Memory element N3, it will be noted that this Memory element also delivers an output to the operating terminals of the Memory element 303 through the Or element 309. Consequently, the Memory element 303 produces an output which energizes the Not element 305 through the Or element 301. Such energization of the Not element 305 terminates the first notching signal supplied to the bus 307 without immediate effect on the operation of the system. In addition, the Memory element 303 delivers the second notching signal through the bus 311 to the And element P3. The And element P3 now is completely energized and in turn energizes the operating terminals of the Memory element T3 through the Or element R3.

The operated Memory element T3 delivers a voltage between the terminals G and a3 which indicates that the elevator car is adjacent the third or top landing. In addition, the Memory element T3 energizes the reset terminals of the Memory element N3 through the Or element X3. Consequently, the Memory element N3 resets and interrupts the supply of energy through the Or element 309 to the Memory element 303. This has no immediate effect on the operation of the system. The reset of the Memory element N3 also terminates the energization of the Memory element T2 through the Or element S2 without immediate effect on the operation of the system. The reset of the Memory element N3 terminates one of the inputs to the And element P3 which in turn terminates its energization through the Or element R3 of the Memory element T3. This has no immediate effect on system operation.

As the elevator car nears the third landing the break contacts 67a reclose to energize therethrough the reset terminals of the Memory element 303. This element terminates the second notching signal delivered to the bus 311 without immediate effect on the operation of the system. The Memory element also terminates its energization of the Not element 305 through the Or element 301. However, this Not element is still energized through the contacts 67a and the Or element 301 and therefore delivers no output to the bus 307.

It will be assumed that the elevator car now prepares to return to the bottom landing. This preparation includes the opening of the contacts 57a without immediate effect on the operation of the selector. In addition, the make contacts 58a close to indicate that the elevator car is set for down travel.

As the elevator car moves in the down direction, the notching inductor relay 63a reaches its associated inductor plate located between the third and second landings. As a result the break contacts 67a open to interrupt the energization of the Not element 305 through the Or element 301. Since the Not element 305 now is completely deenergized, it produces the first notching signal. The only one of the And elements which is now fully energized is the And element K2. This element receives not only the first notching signal, but also a signal through the contacts 58a. The And element K2 receives a third energization from the Memory element T3 which is still in operated condition.

As a result of its full energization the And element K2 energizes the Memory element N2 through the Or element W2. In operating, the Memory element N2 supplies energization to the And element P2 but this latter element is not completely energized. The Memory element N2 also energizes the reset terminals of the Memory element T1 through the Or element S1 without immediate effect on the operation of the system.

When it operates, the Memory element N2 further energizes the reset terminals of the Memory element T3 through the Or element S3. Consequently, the Memory element T3 resets to terminate the voltage appearing between the terminals G and a3. The Memory element T3 also terminates the energization of the reset terminals of the Memory element N3 through the Or element X3 without immediate effect on the operation of the system. Finally, the Memory element T3 terminates its energization of the And element K2. The And element in turn discontinues its energization of the operating terminals of the Memory element N2 through the Or element W2 without further effect at this time on the operation of the system.

Returning to the output of the Memory element N2, it should be noted that this element further supplies an output to the operating terminals of the Memory element 303 through the Or element 109. Consequently, the Memory element 303 energizes the Not element 305 through the Or element 301, and the Not element therefore discontinues the first notching signal supplied to the bus 307. Such discontinuance has no immediate effect on the operation of the system.

In addition, the Memory element 303 supplies through the bus 311 an input to the And element P2. The And element P2 now is fully energized, and in turn energizes the operating terminals of the Memory element T2.

The Memory element T2 now supplies a voltage between the terminals G and a2 to indicate that the elevator car is adjacent the second landing. The Memory element T2 further supplies energy to the And elements H3 and K1 without affecting the immediate operation of the system. Finally, the Memory element T2 energizes the reset terminals of the Memory element N2 through the Or element X2. The Memory element N2 terminates its supply of energy to the And element P2, but the only effect of this is to terminate the energization of the Memory element T2 from the And element P2.

In addition, the Memory element N2 terminates its energization of the reset terminals of the Memory element T3 through the Or element S3. This has no immediate effect on the operation of the system. The Memory element N2 also discontinues its energization of the Memory element 303 through the Or element 309 without affecting the immediate operation of the system.

As the elevator car continues its downward motion, the break contacts 67a reclose to energize therethrough the reset terminals of the Memory element 303. This element resets to terminate the supply of the second notching signal to the bus 311 without immediate effect on the operation of the system. The Memory element also terminates its energization of the Not element 305 through the Or element 301. However, the Not element remains energized through the break contacts 67a and the Or element 301.

Continued motion of the elevator car in the down direction brings the notching inductor relay 63a adjacent the associated inductor plate located between the first and second landings. Consequently, the break contacts 67a open to interrupt the energization through the Or element 301 of the Not element 305. Since it is now deenergized, the Not element 305 applies the first notching signal to the bus 307. The opening of the contacts 67a interrupts the energization of the reset terminals of the Memory element 303 without immediate effect on the operation of the system.

As a result of the production of the first notching signal, the only And element which is fully energized is the And element K1. This element receives not only the first notching signal, but in addition it receives energization through the make contacts 58a. A third input is supplied to the And element K1 from the Memory element T2.

As a result of its energization, the And element K1 energizes the operating terminals of the Memory element N1 and this latter element supplies energization to the And element P1. However, the And element P1 is not yet fully energized.

The Memory element N1 also supplies energy through the Or element S2 to the reset terminals of the Memory element T2. This Memory element T2 consequently resets to terminate the voltage supplied to the terminals G and a2. The Memory element T2 further terminates the energization therefrom of the And element H3 without immediate effect on the operation of the system. Interruption of the energization supplied by the Memory element T2 through the Or element X2 to the reset terminals of the Memory element N2 also has no effect on the immediate operation of the system. Interruption of the energy supplied from the Memory element T2 to the And element K1 terminates the full energization of the And element. Consequently, the And element no longer supplies energy to the Memory element N1. However, this has no effect on the immediate operation of the system.

Returning to the operated Memory element N1, it should be noted that this element supplies energy to the operating terminals of the Memory element 303 through the Or element 309. Consequently, the Memory element 303 energizes the Not element 305 through the Or element 301. This terminates the first notching signal which was supplied by the Not element to the bus 307.

In addition, the Memory element 303 supplies the second notching signal through the bus 311 to the And element P1. The And element P1 now is fully energized and supplies energy through the Or element R1 to the operating terminals of the Memory element T1.

As a result of its operation the Memory element T1 supplies a voltage between the terminals G and a1 to indicate the presence of the elevator car adjacent the first landing. In addition, the Memory element T1 supplies energy through the Or elements X1 to the reset terminals of the Memory element N1.

In resetting, the Memory element N1 terminates its energization of the And element P1. In turn the And element discontinues its energization through the Or element R1 of the Memory element T1, but this has no effect on the immediate operation of the system.

The reset of the Memory element N1 also terminates the energization through the Or element S2 of the Memory element T2, but this has no effect on the immediate operation of the system. Termination of the energization of the Memory element 303 by the Memory element N1 through the Or element 309 also has no immediate effect on the operation of the system.

As the elevator car nears the first landing, the break contacts 67a reclose to energize the reset terminals of the Memory element 303. This interrupts the energization of the Not element 305 from the Memory element 303 through the Or element 301. However, energization of the Not element is continued through the contacts 67a and the Or element 301.

The resetting of the Memory element 303 also terminates the supply of the second notching signal to the bus 311. This has no effect on the immediate operation of the system.

From the foregoing description it is clear that as the elevator car A proceeds from the bottom landing to the top landing, voltages appear successively between the terminal G and the terminals a1, a2 and a3. As the elevator car returns to the bottom terminal, the voltages appear successively between the terminals G and the terminals a3, a2 and a1. Since the voltages indicate the position of the elevator car, they may be employed for controlling the operation of the elevator system in the same manner discussed for the selector of Figs. 1 and 1A.

Although the selector of Fig. 5 as thus far described is fully operative, it may be desirable for reasons set forth in the discussion of Figs. 1 and 1A to make certain that the selector is in step with the elevator car when the elevator car reaches a predetermined floor or floors. Again it will be assumed that this is to be done when the elevator car reaches the top and bottom floors. To this end a switch 315 is employed for supplying energy through the Or element R1 to the operating terminals of the Memory element T1. The switch 315 is biased to open condition and is cam operated to close only when the elevator car is adjacent the bottom landing. Consequently, if the And element P1 fails to supply energy to the Memory element T1 under such circumstances, the switch 315 closes to assure energization of the Memory element T1 when the elevator car is adjacent the bottom landing.

When the elevator car is adjacent the bottom landing a switch 315A also closes to supply energy through the Or element X3 to the reset terminals of the Memory element N3. Consequently, if the reset terminals of the Memory element N3 are not otherwise energized when the elevator car is adjacent the bottom landing, the closure of the switch 315A assures a resetting operation of the Memory element. The switch 315A is normally open and is cam operated to close only when the elevator car is adjacent the bottom landing.

Closure of the switch 315A also supplies energy through the Or element S3 to the reset terminals of the Memory element T3. This assures the resetting of the Memory element T3 when the elevator car is adjacent the bottom landing.

The operating terminals of the Memory element T3 also may be energized through the Or element R3 by closure of the switch 317. This switch is normally open and is cam operated to close when the elevator car is adjacent the top landing. This assures operation of the Memory element T3 when the elevator car is at the top landing.

A switch 317A is normally open and is cam operated to close when the elevator car is adjacent the top landing. Closure of this switch energizes the reset terminals of the Memory element N1 through the Or element X1, and also energizes the reset terminals of the Memory element T1 through the Or element S1. Consequently, resetting of these two Memory elements is assured when the elevator car is adjacent the top landing.

A switch 319 is normally open and is cam operated to close when the elevator car is adjacent either the top landing or the bottom landing. When the switch closes, it energizes the reset terminals of the Memory element N2 through the Or element X2 and it also energizes the reset terminals of the Memory element T2 through the Or element S2. Consequently, should the selector be out of step when the elevator car is adjacent the top landing or the bottom landing, closure of the mechanically operated switches assures the bringing of the selector into step with the elevator car.

If the selector is designed for a structure having a greater number of landings, components similar to those employed for the second landing of Fig. 5 would be employed for each additional landing. For example, if a mezzanine landing were located between the first and second landings of Fig. 5, components similar to those employed for the second landing would be introduced between those shown for the first and second landings. The association of the added components with the remainder of the components will be understood from the foregoing discussion.

And, Or, Not, Delay, and Memory elements are well known. Examples of such elements will be found in paper No. CP–56–91 entitled Magnetic Logic Circuits for Industrial Control Systems by W. G. Evans, W. G. Hall and R. I. Van Nice, published by the American Institute of Electrical Engineers, 33 West 39th Street, New York city. The paper was available for printing December 30, 1955.

We claim as our invention:

1. In an elevator system for a structure having a plurality of landings, an elevator car, means mounting the elevator car for movement relative to the structure to serve the landings, and landing selecting mechanism comprising a separate selector unit for each of said landings, each of said units comprising an electrical static element having a first electrical condition and a second electrical condition, means responsive to the positioning of the elevator car adjacent to each of said landings for operating the corresponding static element for the last-named landing from the first condition to the second condition, each of said selector units having separate circuit means, and static means responsive to operation of each of said static elements for transferring the corresponding circuit means for the last-named static element from a first electrical condition to a second electrical condition, whereby the condition of each of the circuit means represents a positioning of the elevator car.

2. In an elevator system for a structure having a plurality of landings, an elevator car, means mounting the elevator car for movement relative to the structure to serve the landings, and landing selecting mechanism comprising a separate selector unit for each of said landings, each of said units comprising an electrical static And element having a plurality of input conditions which must be satisfied to produce an output, a first one of said input conditions representing a positioning of the elevator car adjacent to the associated landing, a second one of said conditions comprising a predetermined direction of travel of the elevator car, each of said selector units having circuit means, and separate static means responsive to the output of each of said And elements for operating the associated circuit means from a first electrical condition to a second electrical condition, whereby a condition of each of the circuit means represents direction and positioning of the elevator car.

3. In an elevator system for a structure having a plurality of landings, an elevator car, means mounting the elevator car for movement relative to the structure to serve the landings, and landing selecting mechanism comprising a separate selector unit for each of said landings, each of said units comprising an electrical static And element having a plurality of input conditions which must be satisfied to produce an output, a first one of said input conditions representing a positioning of the elevator car adjacent to the associated landing, a second one of said conditions comprising a predetermined direction of travel of the elevator car, each of said selector units having a Memory element having an output dependent on the last of a plurality of inputs supplied to the Memory element, circuit means coupling each of the Memory elements to receive an input from the associated And element, and means responsive to the condition of a first Memory element for a first landing and to the direction of the elevator car for supplying a second input to the Memory element for a second landing adjacent to said first landing.

4. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, the And element for one of said landings having an output only if it receives inputs corresponding to the first signal, the second signal and a third signal indicating that the Memory element has operated for the next landing displaced from said one of said landings in a direction opposite to said predetermined direction of travel, and means for supplying the third signal for each of the And elements.

5. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, the And element for one of said landings having an output only if it receives inputs corresponding to the first signal, the second signal and a third signal indicating that the Memory element has operated for the next landing displaced from said one of said landings in a direction opposite to said direction of travel, means for supplying the third signal for each of the And elements, and means responsive to successive operations of two Memory elements for resetting the first operated of the successively operated Memory elements.

6. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, the And element for one of said landings having an output only if it receives inputs corresponding to the first signal, the second signal and a third signal indicating that the Memory element has operated for the next landing displaced from said one of said landings in a direction opposite to said direction of travel, means for supplying the third signal for each of the And elements, and means responsive to arrival of the elevator car adjacent a predetermined landing for resetting each operated one of said Memory elements.

7. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, the And element for one of said landings having an output only if it receives inputs corresponding to the first signal, the second signal and a third signal indicating that the Memory element has operated for the next landing displaced from said one of said landings in a direction opposite to said predetermined direction of travel, means for supplying the third signal for each of the And elements, a separate resetting And element for resetting each of the Memory elements, the resetting And element for a landing developing a resetting output for the associated Memory element if the resetting And element receives said second signal and also receives a signal indicating that the Memory element has operated for the next landing displaced from the landing associated with the resetting operation in said predetermined direction of travel.

8. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, the And element for one of said landings having an output only if it receives inputs corresponding to the first signal, the second signal and a third signal indicating that the Memory element has operated for the next landing displaced from said one of said landings in a direction opposite to said direction of travel, means for supplying said third signal for each of the And elements, a separate resetting And element for resetting each of the Memory elements, the resetting And element for a landing developing a resetting output for the associated Memory element if the resetting And element receives said second signal and also receives a signal indicating that the Memory element has operated for the next landing displaced from the landing associated with the resetting operation in said direction of travel, means for supplying the last-named signal for each of the resetting And elements, and means responsive to arrival of said elevator car adjacent a predetermined landing for resetting each operated one of the Memory elements.

9. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, each of said Memory elements when operated producing in succession a third signal and a fourth signal, the And element for one of said landings being coupled to have an output only if it receives inputs corresponding to the first signal, the second signal and a fourth signal indicating that the Memory element has operated for the next landing displaced from said one of said landings in a direction opposite to said direction of travel.

10. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, each of said Memory elements when operated producing in succession a third signal and a fourth signal, the And element for one of said landings being designed and coupled to have an output only if it receives inputs corresponding to the first signal, the second signal and a fourth signal indicating that the Memory element has operated for the next landing displaced from said one of said landings in a direction opposite to said direction of travel, a separate resetting And element for resetting each of the Memory elements, the resetting And element for a landing being designed and coupled to have a resetting output for the associated Memory element if the And element receives said second signal and also receives a third signal indicating that the Memory element has operated for the next landing displaced from the landing associated with the resetting operation in said direction of travel.

11. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, a separate And element for each of the landings, and a separate Memory element responsive to the output of the associated And element for each of the landings, each of said Memory elements when operated producing in succession a third signal and a fourth signal, the And element for one of said landings being designed and coupled to have an output only if it receives inputs corresponding to the first signal, the second signal and a fourth signal indicating that the Memory element has operated for the next landing displaced from said one of said landings in a direction opposite to said direction of travel, a separate resetting And element for resetting each of the Memory elements, the resetting And element for a landing being designed and coupled to have a resetting output for the associated Memory element if the And element receives said second signal and also receives a third signal indicating that the Memory element has operated, and means responsive to arrival of said elevator car adjacent a predetermined landing for resetting each operated one of the Memory elements.

12. In an elevator system for a structure having a plurality of landings, means mounting the elevator car for movement relative to the structure to serve the landings, first signal means for deriving a first signal representative of car position relative to successive landings, second signal means for deriving a second signal representative of a predetermined direction of travel for which the elevator car is set, and third signal means for deriving a third signal representative of a position of said elevator car, and static means having an output representative of the presence of all of said signals.

13. In an elevator system for a structure having a plurality of landings, means mounting the elevator car for movement relative to the structure to serve the landings, first signal means for deriving a first signal representative of car position relative to successive landings, second signal means for deriving a second signal representative of a predetermined direction of travel for which the elevator car is set, third signal means for deriving a third signal representative of a position of said elevator car, and static means having an output representative of the presence of all of said signals, said static means having a memory action preserving said output despite discontinuance of at least one of said signals, said static means including means responsive to a fourth signal for terminating said output.

14. In an elevator system for a structure having a plurality of landings, means mounting the elevator car for movement relative to the structure to serve the landings, first signal means for deriving a first signal representative of car position relative to successive landings, second signal means for deriving a second signal representative of a predetermined direction of travel for which the elevator car is set, third signal means for deriving a third signal representative of a position of said elevator car, static means having an output representative of the presence of all of said signals, and fourth signal means signal representative of car position, said static means including means responsive to said fourth signal for terminating said output.

15. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, means for generating a third signal representative of a second direction of travel of the car opposite to the predetermined direction, first and second And elements for each of the landings, means including a separate Memory element responsive to any output from the And elements for each of the landings, the first And element for one of said landings having an output only if it receives inputs corresponding to the first signal, the second signal and a fourth signal indicating that the Memory element has operated for the next landing in the second direction from said one of said landings, and the second And element for said one of said landings having an output only if it receives inputs corresponding to the first signal, the third signal and a fifth signal indicating that the Memory element has operated for the next landing in the predetermined direction from said one of the landings, and means for generating said fourth and fifth signals.

16. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, means for generating a third signal representative of a second direction of travel of the car opposite to the predetermined direction, first and second And elements for each of the landings, means including a separate Memory element responsive to any output from the And elements for each of the landings, the first And element for one of said landings having an output only if it receives inputs corresponding to the first signal, the second signal and a fourth signal indicating that the Memory element has operated for the next landing in the second direction from said one of said landings, and the second And element for said one of said landings having an output only if it receives inputs corresponding to the first signal, the third signal and a fifth signal indicating that the Memory element has operated for the next landing in the predetermined direction from said one of the landings, means for generating said fourth and fifth signals, and means responsive to a predetermined position of the elevator car for resetting each operated one of the Memory elements.

17. In an elevator system for a structure having a plurality of landings, an elevator car, means mounting the elevator car for movement relative to the structure to serve the landings, and landing selection means comprising means for generating a first signal for each movement of the elevator car between successive landings, means for generating a second signal representative of a predetermined direction of travel for which the elevator car is set, means for generating a third signal representative of a second direction of travel of the car opposite to the predetermined direction, first and second And elements for each of the landings, means including a separate Memory element responsive to any output from the And elements for each of the landings, the first And element for one of said landings having an output only if it receives inputs corresponding to the first signal, the second signal and a fourth signal indicating that the Memory element has operated for the next landing in the second direction from said one of said landings, and the second And element for said one of said landings having an output only if it receives inputs corresponding to the first signal, the third signal and a fifth signal indicating that the Memory element has operated for the next landing in the predetermined direction from said one of the landings, means for generating said fourth and fifth signals, means responsive to the presence of the second signal and to the operation of the Memory element for the next landing from said one of said landings in the predetermined direction for resetting the Memory element for said one of said landings, and means responsive to the presence of the third signal and the operation of the Memory element for the next landing from said one of the landings in the second direction for resetting the Memory element for said one of said landings.

18. In an elevator system for a structure having a plurality of landings, an elevator car, means mounting the elevator car for movement relative to the landings, means responsive to arrival of the elevator car adjacent each of the landings for generating successively a pair of signals, and means responsive to the first of said signals to be generated for a landing for resetting the signal generating means for the landing which the elevator car last left.

19. In an elevator system for a structure having a plurality of landings, an elevator car, means mounting the elevator car for movement relative to the landings, means responsive to arrival of the elevator car adjacent each of the landings for generating successfully a pair of signals, and means responsive to the first of said signals to be generated for a landing for resetting the signal generating means for the landing which the elevator car last left, and means responsive to arrival of the elevator car adjacent a predetermined position for resetting each operated one of the signal generating means.

20. In an elevator system for a structure having a plurality of vertically-spaced landings including an upper terminal landing, a lower terminal landing and a plurality of intermediate landings, an elevator car, means mounting the elevator car for movement in up and down directions to serve the landings, and landing selection means comprising means generating a first signal for each movement of the elevator car between successive landings, means generating a second signal representative of the up direction of travel for which the elevator car is set, means for generating a third signal representative of the down direction of travel for which the elevator car is set, a separate first and a separate second And element for each of the landings at which the elevator car may stop during travel in the up direction, a separate third and a separate fourth And element for each of the landings at which the elevator car may stop during travel in the down direction, a Memory element for each of said landings, means responsive to the output of each of the first and third And elements for any of the landings for operating the Memory element for such landing, means responsive to the output of each of the second and fourth And elements for any of the landings for resetting the Memory element for such landing, means responsive to each operation of a Memory element for producing successively first and second output signals, means for energizing each of the first And elements by the first signal and the second signal, means for energizing further the first And element of such landing by the second output signal of the Memory element for the next landing below the landing of such And element, means for energizing each of the third And elements by the first signal and the third signal, means for energizing further the third And element of each landing by the second output signal of the Memory element for the next landing above the landing of such And element, means for energizing the fourth And element for the lower terminal landing and all of the second And elements for the intermediate landings by the second signal, means for further energizing the fourth And element for the lower terminal landing and all of the second And elements for the intermediate landings, each by the first output signal of the Memory element for the landing above such And element, means for energizing the second And element for the upper terminal landing and the fourth And elements for the intermediate landings by the third signal, and means for energizing further the second And element for the upper terminal landing and the fourth And elements for the intermediate landings, each by the first output signal of the Memory element for the landing below such And element.

21. A system as claimed in claim 20 in combination with a separate Delay element connected for energization by each of the Memory elements, the output of one of the Memory elements and the output of the associated Delay element constituting said successive first and second output signals.

22. A system as claimed in claim 20 in combination with means responsive to a predetermined position of the elevator car for resetting all of the Memory elements.

23. A system for producing a signal of predetermined length comprising a Not element, a first Memory element, means coupling the output of the Not element to the input of the first Memory element, a time delay device, a second Memory element having its input derived from the first Memory element through the time delay device, means responsive to the output of the second Memory element for resetting the first Memory element, and means coupling the input of the Not element to the resetting input of the second Memory element, whereby a change in the energy applied to the Not element produces a signal output from the first Memory element having a duration determined by said time delay device.

24. A system for producing a signal of predetermined length comprising a first Memory element, a time delay device and a second Memory element, means coupling the input of the time delay device to the output of the first Memory element, means coupling the output of the time delay device to the input of the second Memory device, and means coupling the output of the second Memory device to the resetting input of the first Memory device, whereby a pulse applied as the operating input of the first Memory element produces an output signal from the first Memory element having a duration determined by the time delay device.

25. In a system for producing successive signals, a Not element, a Memory element, means coupling the resetting input of the Memory element to the input of the Not element, means coupling the output of the Memory element to the input of the Not element, and means effective only during presence of an output from the Not element for energizing the operating input of the Memory element, whereby a second output signal from the Memory element can occur only after generation of a first output signal from the Not element.

26. In an elevator system for a structure having a plurality of landings including an upper terminal landing, a lower terminal landing and a plurality of intermediate landings, an elevator car, means mounting the elevator car for movement in up and down directions to serve the landings, and landing selection means comprising means generating a first signal for each movement of the elevator car between successive landings, means generating a second signal representative of the up direction of travel for which the elevator car is set, means for generating a third signal representative of the down direction of travel for which the elevator car is set, means generating a fourth signal following generation of each first signal, a first And element for each of the landings at which the elevator car may stop during up travel, a second And element for each of the landings at which the elevator car may stop during down travel, first and second Memory elements for each of the landings, means coupling each of the And elements to the operating input of the first Memory element for the associated landing to operate such Memory element, means effectively coupling the output of each of the first Memory elements to the operating input of the second Memory element only in the presence of said fourth signal, means for energizing each of the first And elements by the output of the second Memory element for the next landing below the landing of such first And element to be energized, means for energizing each of the second And elements by said third signal, means for energizing each of the second And elements by the output of the second Memory element for the next landing above such second And element to be energized, and means coupling the second Memory element for each of the landings to be reset by the output of the first Memory element for any landing next to the landing of such second Memory element to be reset.

27. A system as claimed in claim 26 in combination with means responsive to presence of the elevator car adjacent a predetermined position for resetting all of said second Memory elements.

<center>No references cited.</center>